United States Patent [19]

Cononi et al.

[11] Patent Number: 4,575,623

[45] Date of Patent: Mar. 11, 1986

[54] OPTICAL CODE SCANNER AND DISPLAY

[75] Inventors: Victor L. Cononi, Raleigh, N.C.; Herbert D. McClain, Quaker City, Ohio

[73] Assignee: NCR Corporation, Dayton, Ohio

[21] Appl. No.: 690,422

[22] Filed: Jan. 10, 1985

[51] Int. Cl.$^4$ ............................................. G06K 15/00
[52] U.S. Cl. ..................................... 235/383; 235/454
[58] Field of Search ................................. 235/383, 454

[56] References Cited

U.S. PATENT DOCUMENTS 4,084,742  4/1978  Silverman ........................... 235/383

Primary Examiner—Harold I. Pitts

Attorney, Agent, or Firm—Wilbert Hawk, Jr.; Edward Dugas; Richard W. Lavin

[57] ABSTRACT

A check-out counter having an optical scanning system mounted therein includes, a cover member located on the top surface of the check-out counter. The cover member contains a plurality of apertures through which the optical scanning system will scan a coded label on a merchandise item. A raised housing member having an inclined top surface in which is located a display is secured to the top surface of the counter. The display is orientated to allow the customer to observe, simultaneously, the display, which displays the price of the item being scanned, and the item itself as it moves past the aperture during a scanning operation.

6 Claims, 6 Drawing Figures

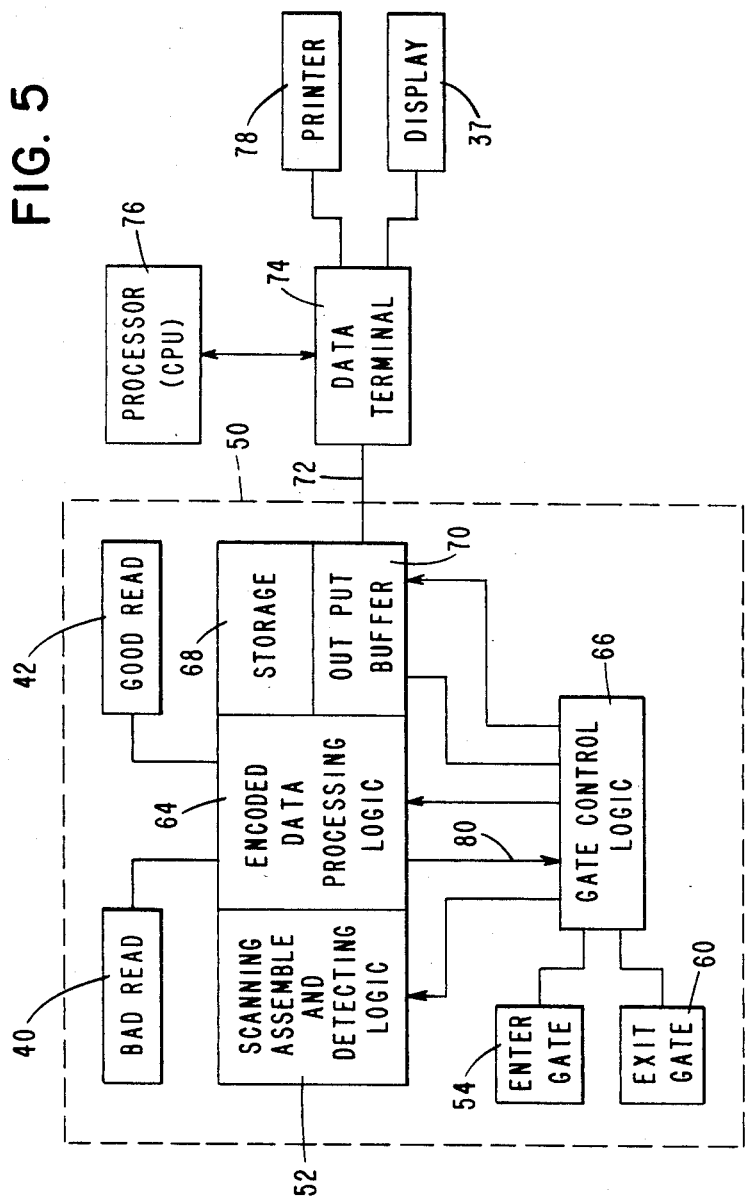

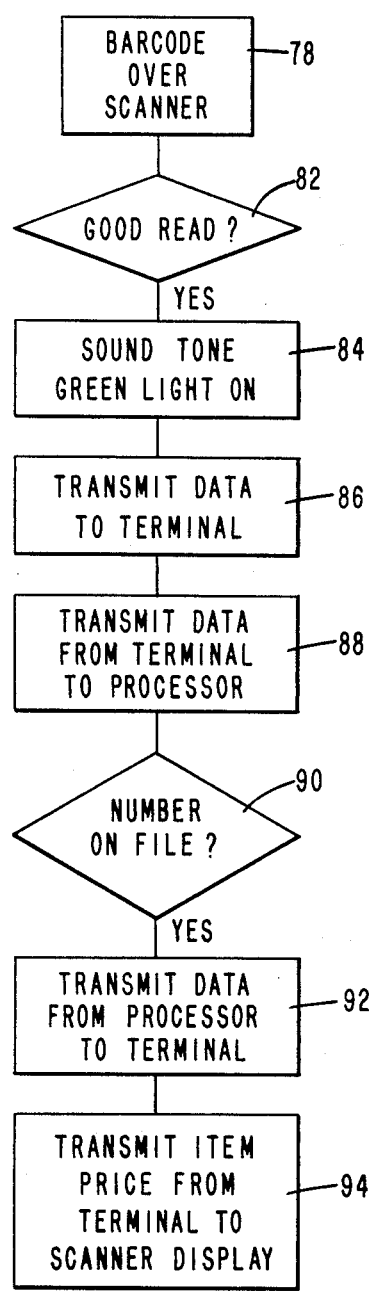

OPTICAL CODE SCANNER AND DISPLAY

BACKGROUND OF THE INVENTION

The present invention pertains to check-out counters and, more particularly, to a check-out counter constructed to include an optical scanning system for scanning a coded label fixed to a merchandise item and a display for displaying the decoded data associated with the coded label.

Present check-out systems include a point of sale terminal device positioned adjacent a check-out counter which includes an optical scanning section for scanning a coded label and for generating signals representing the data, pertaining to the cost of the purchased item, printed on the coded label. The price of the purchased item is displayed in either the display portion of the data terminal device or in a remote display member mounted on top of the data terminal device which can be observed by both the customer and the check-out operator. This arrangement has resulted in complaints from customers and other consumer groups that it is hard to correlate the price displayed with the merchandise item being scanned in order to check the accuracy of the check-out operation due to the distance between the scanning area of the check-out counter and the display.

It is therefore a principal object of this invention to provide a check-out counter which includes an optical scanning system and a display for displaying the price data read by the scanning system.

It is another object of this invention to provide a check-out counter with an optical scanning system and a display arranged in the check-out counter to allow the customer to observe, simultaneously, the merchandise item being scanned and the price of the item on the display.

SUMMARY OF THE INVENTION

In order to fulfill these objects, there is provided a display associated with an optical scanning system for scanning UPC bar code labels located on the merchandise item. The scanning system is located within a portion of the check-out counter and includes a cover having an aperture located therein through which a scanning beam is projected to read a bar coded label attached to a merchandise item being moved past the aperture. The cover member includes a raised housing structure located along one edge of the cover member adjacent to which normally the customer stands during the check-out operation. The housing structure has a top surface portion which includes a mounted display orientated in a common vertical plane with the aperture of the cover member enabling the customer to view, simultaneously, both the face of the display and the merchandise item being scanned. The customer may then compare the price of the merchandise item and the item itself.

A second embodiment of the invention includes a second housing structure similar to that of the first housing structure located on the opposite edge of the cover member adjacent the position of the check-out operator. Additionally, the display is orientated in line with the check-out operator thereby enabling the check-out operator to view, simultaneously, the price of the merchandise item and the merchandise item.

The aforementioned and other objects and advantages of the invention will be apparent from the following more particular description of the preferred embodiment of the invention, as illustrated in the accompanying drawings.

BRIEF DESCRIPTION OF THE DRAWING

FIG. 5 is a block diagram of the optical scanning system of the present invention; and FIG. 6 is a flow chart of the bar code scanning operation.

DESCRIPTION OF A PREFERRED EMBODIMENT

Figure 1:
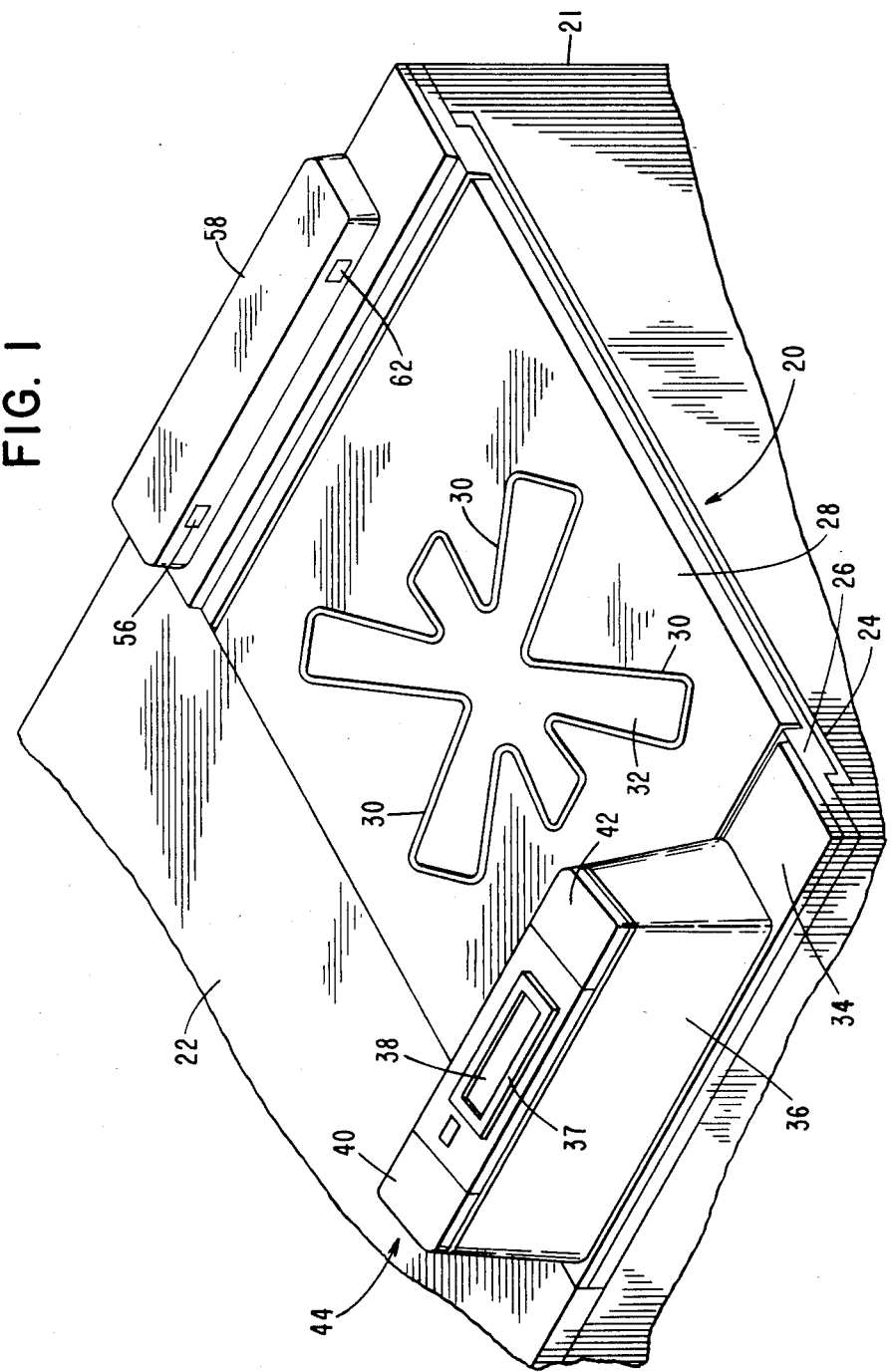
FIG. 1 is the perspective view of the scanning portion of a check-out counter showing the location of the display with respect to the bar code scanning system.
Figure 2:
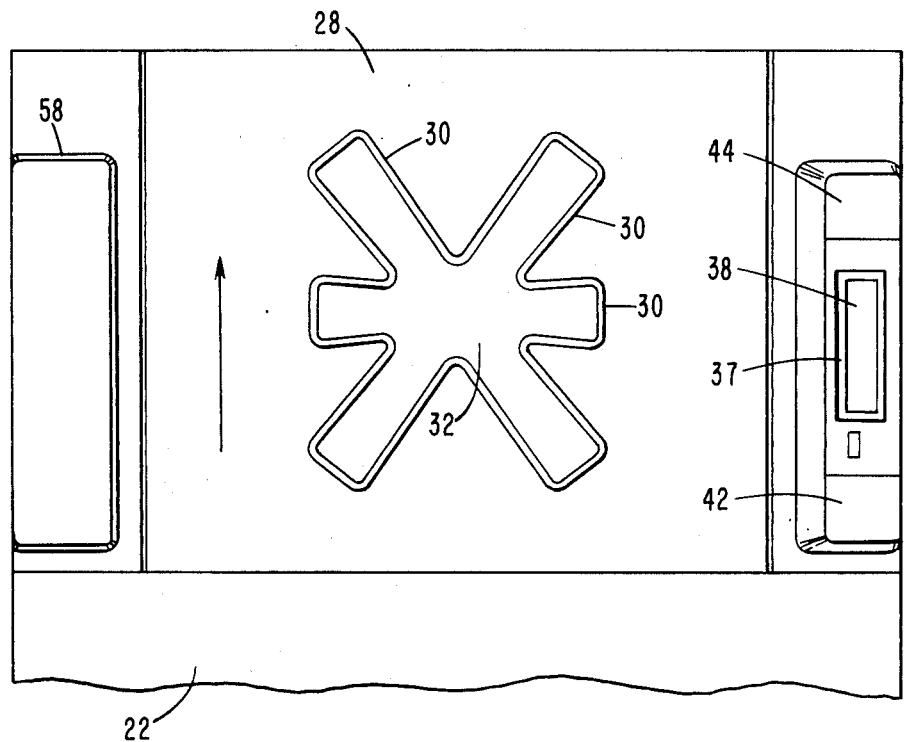
FIG. 2 is the top view of the scanning portion of the check-out counter of FIG. 1.
Figure 3:
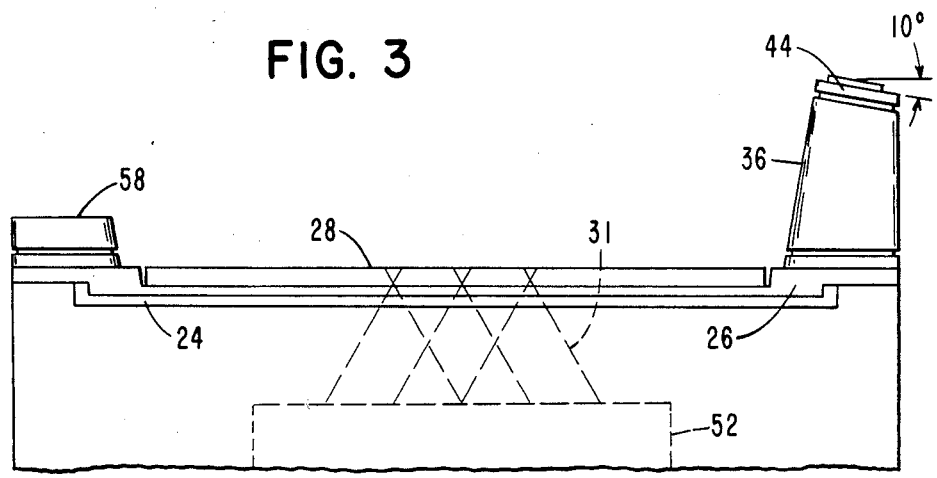
FIG. 3 is a side view of the scanning portion of the check-out counter of FIG. 1.

Referring now to FIGS. 1–3 inclusive, wherein there is shown various views of a scanning cover assembly, generally indicated by the numeral 20, which is normally located on the end portion 22 of a check-out counter 21. The cover assembly 20 includes a base member 24 and a support frame member 26 mounted on the base member 24. A cover member 28, hinged at one end by any conventional hinge members (not shown) includes a plurality of apertures 30 arranged in the configuration shown in FIG. 1. The scanning light beams 31 (FIG. 3) of a bar code scanning mechanism 52 (FIGS. 3 and 5) located within the check-out counter are projected through the plurality of apertures 30. Reference may be made to U.S. Pat. No. 4,093,865 for a complete description of the mounting of a typical bar code scanner system within an enclosed housing such as a check-out counter.

Secured to the support frame member 26 is a transparent plate member 32, positioned adjacent the apertures 30, which, in the present embodiment, is composed of glass. Extending along one edge of the frame support member 26 is a plate member 34 to which is mounted a rail housing member 36. The rail housing member includes a display 37 (FIGS. 1 and 5) for displaying the price of the merchandise item that is positioned adjacent the aperture 30. The face plate 38 of the display 37, together with indicator lights 40 and 42, form a display assembly, generally indicated by the numeral 44, which comprises the top surface of the housing member 36. As shown in FIG. 3, the top surface 44 of the display assembly is off-set from a horizontal plane parallel to the top surface of the cover member 28 by an acute angle of ten degrees thereby enabling the customer to more easily observe the price displayed on the face plate 38 and the merchandise item itself so as to be able to correlate the price with the merchandise item being scanned.

Figure 4:
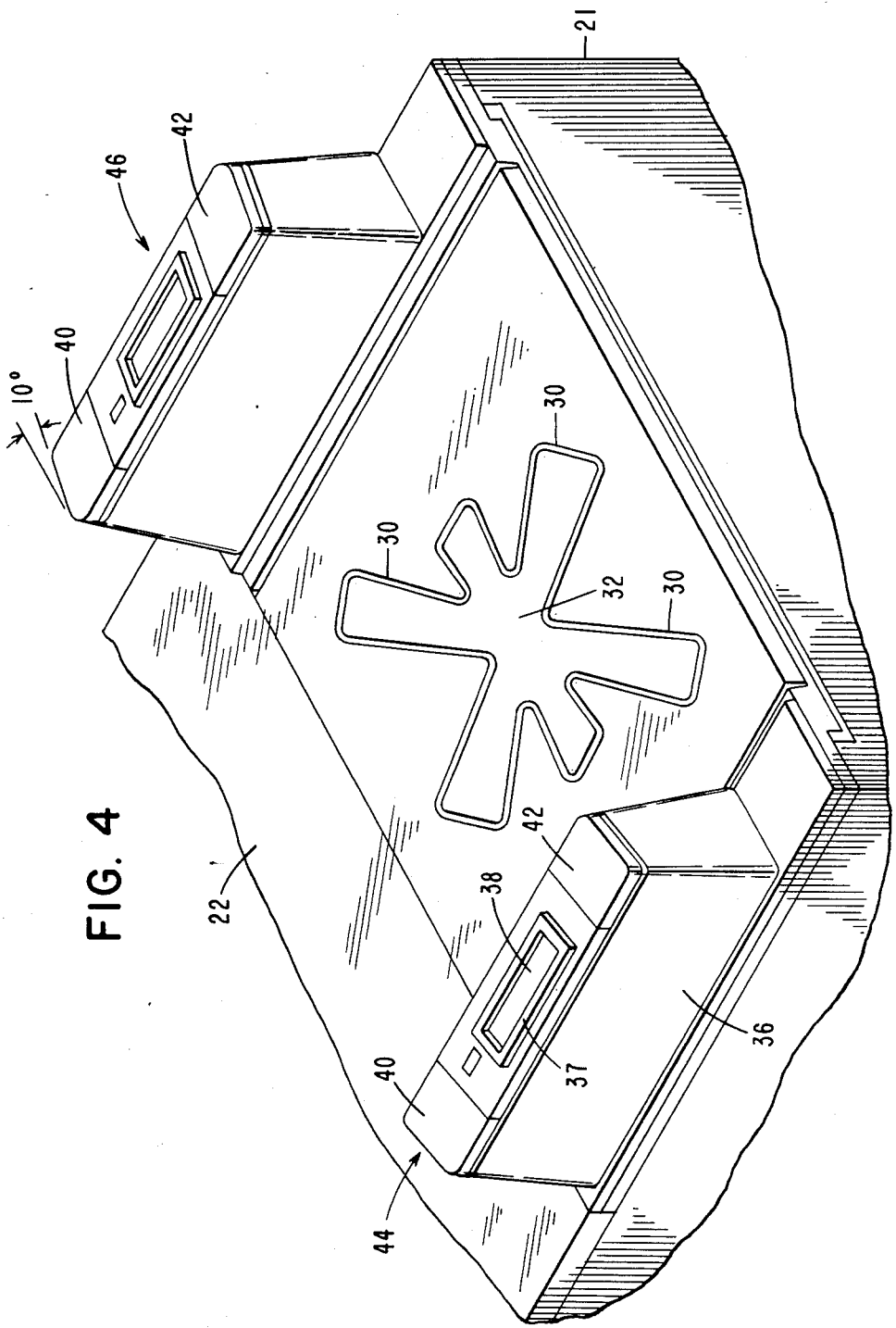
FIG. 4 is a perspective view of another embodiment of this present invention.

Referring now to FIG. 4, wherein there is shown a second embodiment of the present invention, which embodiment includes, a second display assembly, generally indicated by the numeral 46, which is mounted on a housing member 48. The display assembly 46 is again offset by ten degrees similar to that of the display assembly 44 but, orientated toward the position of the check-out operator thereby enabling the operator to observe the scanning of the merchandise item in the same manner as the customer.

Referring now to FIG. 5, wherein there is shown a block diagram of the data processing system employed in the present invention. Included in the data processing system is a bar code scanning system 50, shown within a dotted line. Included in system 50 is: the scanning assembly and detecting logic unit 52 (FIG. 3) for processing a signal generated by the scanning assembly; an item enter gate member 54, comprising a photo diode (not shown) located in the housing 36 (FIGS. 1-3 inclusive) for receiving the light beam from a light source 56, located in the housing member 58 mounted on the opposite edge of the cover assembly 20; an item exit gate member 60, comprising a photo diode (not shown) for receiving a light beam from a light source 62, located in the housing member 58; an encoded data processing logic unit 64 for checking and decoding the encoded data read by the scanning assembly 52 and for generating a signal to the gate control logic unit 66 to indicate the validity of the read operation; a conventional memory storage 68; and an output buffer member 70 for transmitting read data, over line 72, to a data terminal 74; and a central processing unit (CPU) 76 connected to the data terminal 74. The processing unit 76 processes the data and generates numerical signals representing the price of the merchandise item. The price data is then transmitted back to the terminal 74 which operates a printer 76 to print the price on a record member and operates the display 37 to display the price of the item to the customer.

There will now be described an operation of the scanning system taken in conjunction with the flow chart diagram of FIG. 6. Movement of a merchandise item across the cover 28 of the scanning assembly 20 in the direction indicated by the arrow in FIG. 2 will trip the entry item gate member 54, thereby generating an enabling signal for enabling the scanning assembly 52 (FIG. 5) to scan the bar code label (Block 78) (FIG. 6) and transmit the data read to the processing logic unit 64 (FIG. 5). The processing logic unit 64 will decode and check the encoded data to determine if the data is valid or not and then generate a control signal over line 80 to the gate control logic unit 58 indicating a good or bad read operation (Block 82). If the scanning operation produces a good read, logic unit 64 will operate a tone generator (not shown) that operates the good read indicator by turning on the light indicator 42 which, in the present embodiment, is green (Block 84). If the encoded data is determined to be valid by the logic unit 64, the data is transmitted over line 72 (FIG. 5) to the data terminal 74 (Block 86) (FIG. 6) that transmits the data to the processor 76 (Block 88) which in turn uses the encoded data to extract further item data including the price of the item (Block 90) scanned. The processor 76 then transmits the item price data back to the data terminal 74 (Block 92) which operates the printer 72 to print the price on a receipt member and which also operates the customer display 37 (Block 94) to display the price of the purchased item to the customer.

It will be seen that there has been described a display arrangement in association with an optical scanning system which provides a display within a customer's field of view that will enable the customer to view simultaneously both the item being scanned and the price of the item scanned. The display is integrated into the check-out housing providing a rapid check-out operation of the purchased items.

We claim:

1. In combination with an optical scanning system in which a scanning beam is projected to a position where there is located a coded label to be scanned,
   a cover member for supporting a merchandise item on which is located a coded label to be read;
   an aperture located in the cover member through which the scanning beam is projected to read the coded label on the merchandise item positioned adjacent the aperture;
   a housing member mounted adjacent said support member and having an inclined top surface at an acute angle to a plane parallel to the top surface of the cover member;
   processing means for generating a numerical value representing the purchase price of the merchandise item being scanned in response to the scanning of the coded label by the scanning beam; and
   display means mounted on the top surface of the housing member and operated by said processing means for displaying the purchase price of the item being scanned, said display means positioned in a common vertical plane with the aperture in the cover member enabling the customer to view simultaneously the merchandise item being scanned and the display displaying the price of the item being scanned.

2. The combination of claim 1 in which said angle is 10 degrees.

3. The combination of claim 2 which further includes first indicator means mounted on said top surface of the housing member adjacent said display means, said indicator means operated by said processing means to indicate the occurrence of a valid scanning operation.

4. The combination of claim 3 which further includes a second indicator means mounted on said top surface adjacent said display means opposite said first indicator means, said second indicator means operated by said processing means to indicate the occurrence of an invalid scanning operation.

5. The combination of claim 2 which further includes a second housing member mounted adjacent said cover member opposite to said first housing member, said second housing member having a second top surface inclined at an acute angle to a plane parallel to the surface of the cover member; and
   a second display means mounted on said second top surface for displaying the purchase price of the merchandise item being scanned, said second display means positioned in a common vertical plane with the aperture in the cover member enabling an operator to view simultaneously the merchandise item being scanned and the display displaying the price of the merchandise item being scanned.

6. In combination with an optical scanning system located within a checkout counter having a top surface portion in which a scanning beam is projected to a position on the top surface portion of the check-out counter for scanning a coded label on a merchandise item purchased by a customer;
   a cover member rotatably mounted to the top surface portion of the checkout counter for supporting a merchandise item purchased by a customer on which is located a coded label to be read;
   a plurality of apertures located in the cover member through which the scanning beam is projected to read the coded label on the merchandise item positioned adjacent the apertures;
   a vertically extended housing member mounted on the top surface portion of the checkout counter adjacent one edge of the cover member, said housing member having a top surface portion inclined at an acute angle to a plane parallel to the top surface of the cover member;

processing means for generating data representing the purchase price of the merchandise item being scanned in response to the scanning of the coded label on the item by the scanning beam; and a multi-digit display member mounted on the top surface portion of the housing member and operated by said processing means for displaying the purchase price generated by said processing means, said display member positioned in a vertical plane which extends through the apertures in the cover member enabling the customer to view simultaneously the merchandise item being scanned and the display member displaying the price of the merchandise item being scanned.

* * * * *